United States Patent Office 3,272,791
Patented Sept. 13, 1966

3,272,791
MONOAZO COMPOUNDS CONTAINING A 5-AMINO - 3 - SUBSTITUTED - 1,2,4 - THIADIAZOLE RADICAL
William H. Moore, Edmund B. Towne, and Joseph B. Dickey, Kingsport, Tenn., assignors to Eastman Kodak Company, Rochester, N.Y., a corporation of New Jersey
No Drawing. Filed Mar. 29, 1963, Ser. No. 269,167
11 Claims. (Cl. 260—155)

This invention relates to new monoazo compounds and their application to the art of dyeing or coloring.

While numerous compounds have been proposed as dyes for cellulose alkyl carboxylic acid ester, having 2 to 4 carbon atoms in the acid groups thereof, textile materials, polyester textile materials, nylon textile materials and acrylonitrile polymer textile materials, much time and effort are being expended to find improved dyes for these materials.

It is an object of our invention to provide new monoazo compounds which are dyes for the aforesaid textile materials. Another object is to provide colored textile materials which have good fastness to light, gas and washing, good resistance to sublimation and which undergo little change in color under artificial light. A further object is to provide colored textile materials which discharge to a pure white. Another object is to provide satisfactory means for the preparation of the new monoazo compounds of our invention.

We have discovered that the new monoazo compounds having the formula:

(I) 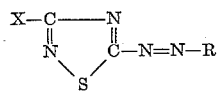

wherein X represents a low carbon alkylthio group or a low carbon alkylsulfonyl group and R represents a member selected from the radical of a tetrahydroquinoline coupling compound free of a water-solubilizing group and the radical of a benzomorpholine coupling compound free of a water-solubilizing group, said tetrahydroquinoline and benzomorpholine radicals being joined through the carbon atom in their 6-positions to the azo linkage, are dyes for the aforesaid textile materials. The term "water-solubilizing group" refers to groups such as a sulfonic acid group or a carboxylic acid group, for example. The term "tetrahydroquinoline" as used herein and in the claims refers to 1,2,3,4-tetrahydroquinoline. Representative of a low-carbon alkylthio group are methylthio, ethylthio, n-propylthio, isopropylthio, n-butylthio, isobutylthio, sec.-butylthio and tert.-butylthio. Representative of a low-carbon alkylsulfonyl group are methylsulfonyl, ethylsulfonyl, n-propylsulfonyl, isopropylsulfonyl, n-butylsulfonyl, isobutylsulfonyl, sec.-butylsulfonyl and tert.-butylsulfonyl.

Our new monoazo compounds have good to excellent affinity for cellulose alkyl carboxylic acid ester, having 2 to 4 carbon atoms in the acid groups thereof, textile materials, polyester textile materials, acrylonitrile polymer textile materials and nylon textile materials and yield dyeings thereon which have good fastness to light, gas and washing, good resistance to sublimation, good dischargeability and which undergo little change in color under artificial light.

The new monoazo compounds of our invention are water-insoluble. They are applied to the aforesaid textile materials by known dyeing techniques. Being water-insoluble they can be applied from aqueous dispersions in the manner of the so-called "disperse dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the azo compounds will not have the same degree of utility for the same material.

By cellulose alkyl carboxylic acid esters having 2 to 4 carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

Linear aromatic polyester textile materials that can be dyed with the new azo compounds of our invention include polyethylene terephthalate textile materials obtained, for example, as described in U.S. Patent 2,465,319 patented March 22, 1949, or polyester textile materials formed from other fiber-forming linear polyesters, such as polyesters derived from p,p'-diphenylsulfonedicarboxylic acid and various aliphatic acids and glycols as described in U.S. Patent 2,744,088 patented May 1, 1956, and polyesters derived from various acids, such as terephthalic acid and 1,4-cyclohexanedimethanol (1,4-dimethylolcyclohexane) as described in Kibler, Bell and Smith U.S. Patent 2,901,466.

The polyester materials sold under the trademarks "Kodel," "Dacron" and "Terylene," for example, in the form of filaments, yarn and fabric, for example, are illustrative of the linear polyester textile materials that can be dyed. Kodel polyester materials are more particularly described in U.S. Patent 2,901,466. Dacron and Terylene polyester materials are described, for example, in U.S. Patent 2,465,319. The polyester textile materials specifically referred to hereinbefore are linear aromatic polyesters having a melting point of at least 200° C. Linear aromatic polyesters having a lower melting point than 200° C. can also be dyed or colored with the new azo compounds of our invention. U.S. Patents 2,945,010; 2,957,745 and 2,989,363 also disclose polymeric linear polyester materials that can be dyed.

Unless otherwise indicated, the term "acrylonitrile polymer" as used herein includes polymers consisting essentially of polymerized acrylonitrile (i.e., acrylonitrile polymers containing at least 85% by weight of acrylonitrile) as well as modified acrylonitrile polymers known in the art as modacrylics. The modacrylics contain at least 40% but less than 85% acrylonitrile by weight. U.S. Patents 2,811,409; 2,831,826 and 2,843,572 disclose polymeric materials that can be dyed with our new monoazo compounds. Our new monoazo compounds are particularly suited for the dyeing of modacrylic textile materials.

The acrylonitrile polymeric materials sold under the trademarks "Verel," "Orlon" and "Acrilan," in the form of filaments, yarn and fabric, for example, are illustrative of the acrylonitrile polymeric textile materials that can be dyed with our new monoazo compounds.

The new monoazo compounds of our invention are prepared by diazotizing a 5-amino-3-substituted-1,2,4-thiadiazole compound having the formula:

(II) 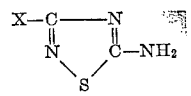

wherein X represents a low carbon alkylthio group or a low carbon alkylsulfonyl group and coupling the diazonium compound obtained with a tetrahydroquinoline coupling component free of a water-solubilizing group or a benzomorpholine coupling component free of a water-solubilizing group.

While our invention relates broadly to the new monoazo compounds having the Formula I, it relates more particularly to the monoazo compounds having the formulas:

(III)

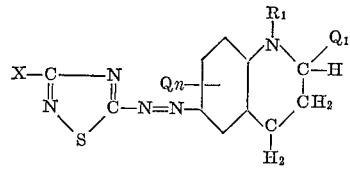

and (IV)

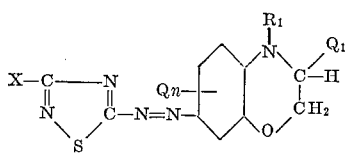

wherein X has the meaning previously assigned to it, $R_1$ represents a hydroxyalkyl group having 2 to 4 carbon atoms, an alkyl group having 1 to 4 carbon atoms, a cyanoalkyl group having 3 to 5 carbon atoms, an acyloxyalkyl group having 4 to 6 carbon atoms or an alkoxyalkyl group having 3 to 4 carbon atoms, $Q_1$ represents a hydrogen atom or a methyl group, Q represents a member selected from a methyl group, a methoxy group, a chloride atom, a bromine atom, a fluorine atom and an alkacylamino group having 2 to 4 carbon atoms and $n$ stands for a member selected from 0, 1 and 2.

Illustrative of the 5-amino-1,2,4-thiadiazole compounds used in preparing the new monoazo compounds of our invention are 5-amino-3-methylthio-1,2,4-thiadiazole,
5-amino-3-ethylthio-1,2,4-thiadiazole,
5-amino-3-n-propylthio-1,2,4-thiadiazole,
5-amino-3-isopropylthio-1,2,4-thiadiazole,
5-amino-3-n-butylthio-1,2,4-thiadiazole,
5-amino-3-isobutylthio-1,2,4-thiadiazole,
5-amino-3-sec.-butylthio-1,2,4-thiadiazole,
5-amino-3-tert.-butylthio-1,2,4-thiadiazole,
5-amino-3-methylsulfonyl-1,2,4-thiadiazole,
5-amino-3-ethylsulfonyl-1,2,4-thiadiazole,
5-amino-3-n-propylsulfonyl-1,2,4-thiadiazole,
5-amino-3-isopropylsulfonyl-1,2,4-thiadiazole,
5-amino-3-n-butylsulfonyl-1,2,4-thiadiazole,
5-amino-3-isobutylsulfonyl-1,2,4-thiadiazole,
5-amino-3-sec.-butylsulfonyl-1,2,4-thiadiazole and
5-amino-3-tert.-butylsulfonyl-1,2,4-thiadiazole.

Illustrative of the alkyl groups represented by $R_1$ are methyl, ethyl, n-propyl, isopropyl and n-butyl. Similarly, β-hydroxyethyl, β-hydroxypropyl, γ-hydroxypropyl, β,γ-dihydroxypropyl, β-methyl-β,γ-dihydroxypropyl and δ-hydroxybutyl are illustrative of the hydroxyalkyl groups $R_1$ represents.

Illustrative of the alkoxyalkyl groups represented by $R_1$ are the β-methoxyethyl and the β-ethoxyethyl groups. Similarly, β-cyanoethyl, γ-cyanopropyl and δ-cyanobutyl are illustrative of the cyanoalkyl groups $R_1$ represents.

Illustrative of the acyloxyalkyl groups represented by $R_1$ are β-acetoxyethyl, β-n-propionoxyethyl and β-n-butyroxyethyl. Acetylamino, propionylamino and butyrylamino are illustrative of the alkacylamino groups represented by Q.

Typical of the tetrahydroquinoline and benzomorpholine coupling components used in the preparation of our invention are tetrahydroquinoline, benzomorpholine,
N-β-hydroxyethyl-5-butyrylaminotetrahydroquinoline,
N-β,γ-dihydroxypropyl-7-acetylaminotetrahydroquinoline,
N-β,γ-dihydroxypropyl-7-propionylaminotetrahydroquinoline,
N-β,γ-dihydroxypropyl-2,2,4-trimethyl-8-chlorotetrahydroquinoline,
N-β-hydroxypropyl-2-methyl-7-bromotetrahydroquinoline,
N-β,γ-dihydroxypropyl-2-methyl-7-bromotetrahydroquinoline,
N-β,γ-dihydroxypropyl-2-methyl-7-chlorotetrahydroquinoline,
N-β-hydroxyethyl-5-chlorotetrahydroquinoline,
N-β-cyanoethyl-5-chlorotetrahydroquinoline,
N-β-hydroxyethyl-5-bromotetrahydroquinoline,
N-β-cyanoethyl-5-bromotetrahydroquinoline,
N-β-hydroxyethyl-5-fluorotetrahydroquinoline,
N-β,γ-dihydroxypropyl-5-fluorotetrahydroquinoline,
N-β-cyanoethyl-2,7-dimethylbenzomorpholine,
N-β-hydroxypropylbenzomorpholine,
N-β,γ-dihydroxypropyl-2,5-dimethylbenzomorpholine,
N-β-cyanoethyl-2,5-dimethylbenzomorpholine,
N-ethyl-2,5-dimethylbenzomorpholine,
N-β-cyanoethyl-2,5,7-trimethylbenzomorpholine,
N-β-cyanoethyl-7-methoxybenzomorpholine,
N-β,γ-dihydroxypropyl-5-methylbenzomorpholine,
N-β,γ-dihydroxypropyl-2-methyl-7-chlorobenzomorpholine,
N-β,γ-dihydroxypropyl-2-methyl-7-bromobenzomorpholine,
N-β,γ-dihydroxypropyl-2-methyl-5-bromobenzomorpholine,
N-β-methyl-β,γ-dihydroxypropyl-2-methylbenzomorpholine,
N-β-hydroxyethyl-7-acetylaminobenzomorpholine,
N-β-cyanoethyl-7-butyrylaminobenzomorpholine,
N-n-butyl-2,7-dimethylbenzomorpholine, and
N-β-ethoxyethyl-2,7-dimethylbenzomorpholine. Inasmuch as coupling occurs in the 6-position of the tetrahydroquinoline and benzomorpholine nucleus this position must be unsubstituted. Other coupling components which can be used in accordance with our invention include N-β,γ-dihydroxypropyl-2,4,7-trimethyltetrahydroquinoline,
N-β-hydroxyethyl-7-chlorotetrahydroquinoline,
N-γ-hydroxypropyl-7-trifluoromethyltetrahydroquinoline,
N-β,γ-dihydroxypropyl-5-acetylaminotetrahydroquinoline,
N-(β-methyl-β,γ-dihydroxypropyl)-2-methyltetrahydroquinoline,
7-methyltetrahydroquinoline,
N-allyl-5-methyltetrahydroquinoline,
N-β-acetoxyethyl-2,7-dimethyltetrahydroquinoline,
N-β-hydroxyethyl-5-propionylaminotetrahydroquinoline,
N-β,γ-dihydroxypropyl-7-butyrylaminotetrahydroquinoline,
N-β-hydroxypropyl-2-methylbenzomorpholine,
N-δ-hydroxybutylbenzomorpholine,
N-β-cyanoethyl-5-methylbenzomorpholine,
2,7-dimethylbenzomorpholine,
N-(β-methylthioethyl)-2,5-dimethylbenzomorpholine,
N-β-cyanoethyl-2,7-dimethyltetrahydroquinoline,
N-β-methoxyethyl-2-methyltetrahydroquinoline,
N-β-carbomethoxyethyl-7-methoxytetrahydroquinoline,
N-β-hydroxyethyl-2,2,4,7-tetramethyltetrahydroquinoline,
N-β-hydroxyethyl-2-methylbenzomorpholine,
N-β-cyanoethyl-7-methylbenzomorpholine,
N-β-methyl-β,γ-dihydroxypropyl-2,7-dimethylbenzomorpholine, and
γ-hydroxypropyl-2,5-dimethylbenzomorpholine, for example.

The following examples illustrate our invention.

EXAMPLE 1

*Preparation of 5-amino-3-methylthio-1,2,4-thiadiazole*

(A) In a 3-l., 3-necked flask, equipped with a mechanical stirrer, thiourea (76 grams), methyl iodide (142 grams), and anhydrous methanol (330 ml.) were stirred together. As soon as complete solution occurred, the reaction mixture began to warm up, after which it was heated on a steam bath. After stirring at reflux for one hour, the condenser was set for distillation, and approximately 70 ml. of the volatile materials were distilled to remove any excess methyl iodide. The solution containing 2-methyl-2-thiopseudourea was cooled to room temperature and a solution of sodium thiocyanate (100 grams) in anhydrous methanol (600 ml.) was added. The resulting solution was cooled to −15° C. by means of a Dry Ice-acetone bath. The flask was equipped with two dropping funnels. In one was placed a cold sodium methoxide solution prepared by dissolving sodium (46 grams) in anhydrous methanol (600 ml.); in the other funnel was placed a cold solution of bromine (160 grams) in anhydrous methanol (425 ml.). With vigorous stirring, approximately 1/7 of the methoxide solution was run into the flask, then both solutions were added at the same rate during 1½ hours, keeping the temperature below −5° C. When the addition was completed, the cooling bath was removed and the reaction mixture stirred for two hours at room temperature. The faintly alkaline solution was neutralized with concentrated HCl and the reaction mixture evaporated to dryness under reduced pressure. The residue was extracted with water to remove inorganic salts, then recrystallized from water with addition of charcoal. The weight of product was 104 grams (71 percent), melting at 139–42° C.

Calculated for 5-amino-3-methylthio-1,2,4-thiadiazole:
C=24.49%; H=3.40%; S=43.54%.
Found: C=24.70%; H=3.49%; S=43.34%.

(B) 2-methyl-2-thiopseudourea sulfate, prepared as in Org. Syn. Coll., vol. II, p. 411, was substituted for the above in situ preparation of 2-methyl-2-thiopseudourea hydrogen iodide to give a 71% yield of the 5-amino-3-methylthio-1,2,4-thiadiazole.

EXAMPLE 2

*Preparation of 5-amino-3-ethylthio-1,2,4-thiadiazole*

30 grams of sodium thiocyanate were dissolved in 250 ml. of methanol with good stirring. To this were added with stirring 54.5 grams of 2-ethyl-2-thiopseudourea hydrobromide (Org. Syn. Coll., vol. III, p. 440). After chilling to −14° C., this solution of sodium thiocyanate and 2-ethyl-2-thiopseudourea hydrobromide was treated simultaneously from two separate dropping funnels containing solutions of (1) bromine (48 grams) in 140 ml. of methanol and (2) sodium methylate in methanol, prepared from sodium (13.8 grams) in 150 ml. of methanol. The reaction mixture was stirred and cooled, and the additions were at such a rate as to keep the temperature at −5° C. and took 1 hour. About 1/7 of the sodium methylate solution was added first, after which the two solutions were added simultaneously. The reaction was stirred 1 hour more without cooling after the addition was complete. The reaction mixture was slightly alkaline and was carefully neutralized with concentrated HCl. It was then filtered from a small amount of precipitated NaBr.

The methanol was removed in vacuo, and the resulting solid residue was triturated and washed twice with water and then air dried. The crude product weighed 39.5 grams (81.7%) and melted at 74–92° C. Crystallization from 100 ml. of water yielded 30 grams of product, M.P. 90–5° C., softening point 60° C. Recrystallization from benzene-hexane yielded 26.2 grams of 5-amino-3-ethylthio-1,2,4-thiadiazole in the form of white needles melting at 92–6° C.

EXAMPLE 3

*Preparation of 5-amino-3-n-propylthio-1,2,4-thiadiazole*

A solution of 76 grams of thiourea and 123 grams of n-propylbromide in 330 ml. of methanol was heated with stirring on a steam bath under reflux for 2 hours. The reaction mixture was then distilled until 50 cc. of solvent had been removed, thus assuring complete removal of any excess n-propylbromide (B.P. 70° C.). If it is desired to isolate 2-n-propyl-2-thiopseudourea hydrobromide at this stage, the solution is further concentrated and then cooled. A white crystalline product is obtained which melts at 59–61° C. when crystallized from alcohol-ether. (See Bellock and Witt, J. Agric. and Food Chem., 1176 (1954); CA 49, 3463 (1955).)

In order to prepare 5-amino-3-n-propylthio-1,2,4-thiadiazole, the above methanol solution of 2-n-propyl-2-thiopseudourea hydrobromide was treated in a 3-liter flask with a solution of 100 grams of sodium thiocyanate in 600 ml. of anhydrous methanol at room temperature. The solution was then cooled to −15° C. and stirred vigorously as the addition of the sodium methoxide solution (46 grams metallic sodium in 600 ml. anhydrous methanol) and of the cold solution of bromine (160 grams bromine in 425 ml. of cold anhydrous methanol) was carried out exactly as described in Example 1 at −5° C. After the addition was complete, the reaction mixture was stirred two hours at room temperature after which it was neutralized with concentrated hydrochloric acid and then evaporated to dryness under reduced pressure.

The residue was extracted with cold water to remove inorganic salts and then was crystallized from water, using charcoal. The dried, tan product weighed 135 grams (77.2%) and melted at 74° C. when crystallized from aqueous ethanol.

EXAMPLE 4

*Preparation of 5-amino-3-isopropylthio-1,2,4-thiadiazole*

A methanolic solution of 28.2 grams of thiourea and 46 grams of isopropyl bromide were heated on the steam bath as described in Example 3 and yielded a practically quantitative yield of 2-isopropylthiopseudourea, M.P. 76–8° C. Treatment of a solution of this product with sodium thiocyanate, bromine and sodium methoxide in accordance with the procedure described in Example 1 gave a good yield of 5-amino-2-isopropylthio-1,2,4-thiadiazole.

EXAMPLE 5

*Preparation of 5-amino-3-tert.-butylthio-1,2,4-thiadiazole*

Example 4 was repeated using 70 grams of tert.-butyl bromide in place of isopropyl bromide. Crystalline 5-amino-3-tert.-butylthio-1,2,4-thiadiazole melting at 203° C. was obtained. (See Ber. 89, 2742 (1946).)

In a similar manner there were prepared:

5-amino-3-n-butylthio-1,2,4-thiadiazole
5-amino-3-isobutylthio-1,2,4-thiadiazole
5-amino-3-sec.-butylthio-1,2,4-thiadiazole

EXAMPLE 6

*Preparation of 5-amino-3-methylsulfonyl-1,2,4-thiadiazole*

5-amino-3-methylthio-1,2,4-thiadiazole (7.35 grams) was dissolved in acetic acid (100 ml.) by warming gently on the steam bath. The solution was cooled to 30° C., and 30% hydrogen peroxide (20.5 grams, a 20% excess) was added all at once, causing precipitation of a white solid. The mixture was stirred and warmed gently to effect solution. Solution occurred at about 50° C., and the temperature then rose spontaneously to 70° C. The solution was stirred until the temperature dropped to 25° C., and was then concentrated to about ¼ its volume under reduced pressure. On standing, 5-amino-3-methylsulfonyl-1,2,4-thiadiazole precipitated as a white solid and was recovered by filtration, washed with water and air dried. It weighed 5.4 grams (65.2%) and had a melting point of 196.8° C.

Calculated for 5-amino-3-methylsulfonyl-1,2,4-thiadiazole: C=20.11%, H=2.80%, S=35.75%. Found: C=20.18%, H=3.00%, S=35.67%.

EXAMPLE 7

*Preparation of 5-amino-3-ethylsulfonyl-1,2,4-thiadiazole*

8.05 grams of 5-amino-3-ethylthio-1,2,4-thiadiazole prepared in Example 2 and melting at 92–6° C. were oxidized to the sulfonyl compound using monoperphthalic acid as described in Ber. 89, 2747 (1956). 1.2 grams of crystallized 5-amino-3-ethylsulfonyl-1,2,4-thiadiazole were obtained, melting at 136–9° C.

EXAMPLE 8

*Preparation of 5-amino-3-n-propylsulfonyl-1,2,4-thiadiazole*

8.7 grams of 5-amino-3-n-propylthio-1,2,4-thiadiazole prepared in Example 3 were dissolved in 100 ml. of acetic acid. To this solution at room temperature were added all at once 20.5 grams of 30% hydrogen peroxide, which is a 20% excess over theoretical. The mixture was then stirred and warmed gently on a steam bath to effect solution of the precipitate. Solution was effected at 50° C., and the temperature then rose spontaneously to 70° C. Stirring was then continued for one hour while allowing the temperature to fall to 25° C. The reaction mixture was then concentrated to about ¼ its volume under reduced pressure. On standing, a white solid separated which, after filtering, washing and drying, yielded 6.5 grams of 5-amino-3-n-propylsulfonyl-1,2,4-thiadiazole.

EXAMPLE 9

*Preparation of 5-amino-3-tert.-butylsulfonyl-1,2,4-thiadiazole*

Example 8 was repeated using 9.4 grams of 5-amino-3-tert.-butyl-1,2,4-thiadiazole in place of 5-amino-3-n-propyl-sulfonyl-1,2,4-thiadiazole. 6.9 grams of 5-amino-3-tert.-butyl-sulfonyl-1,2,4-thiadiazole were obtained.

In a similar manner there were prepared:

5-amino-3-n-butylsulfonyl-1,2,4-thiadiazole
5-amino-3-isobutylsulfonyl-1,2,4-thiadiazole
5-amino-3-sec.-butylsulfonyl-1,2,4-thiadiazole.

EXAMPLE 10

(A) *Diazotization*

Nitrosyl sulfuric acid was prepared by adding 1.52 grams (0.022 mole) of sodium nitrite portionwise and with vigorous stirring to 10 ml. of concentrated sulfuric acid. The temperature of the reaction mixture was not allowed to rise above 65° C. The resulting solution was then cooled to 5° C., and 20 ml. of a mixture of 3 ml. of n-propionic acid and 17 ml. of acetic acid were added dropwise, with stirring, while allowing the temperature to rise to 15° C. and maintaining the solution at this temperature during the remainder of the addition.

The nitrosylsulfuric acid mixture was cooled to 0°–5° C., and 2.94 grams (0.02 mole) of 5-amino-3-methylthio-1,2,4-thiadiazole were added thereto portionwise, with stirring, after which 20 ml. more of the propionic acetic acid mixture were added, keeping the temperature at 0.5° C. The reaction mixture was then stirred at 0–5° C. for 2 hours, and the excess sodium nitrite was destroyed by adding 1 gram of urea. A clear diazonium solution was thus obtained 50 ml.).

(B) *Coupling*

12.5 ml. (0.005 mole) of the 5-amino-3-methylthio-1,2,4-thiadiazole diazonium solution prepared as described in 10(A) were added, with stirring, at 0°–5° C. to a solution of 1.18 grams of N-β,γ-dihydroxypropyl-2,7-dimethyltetrahydroquinoline in 12.5 ml. of the propionic-acetic acid mixture, cooled to 0° C. When the addition was completed, the reaction mixture was made neutral to Congo red by the addition of solid, anhydrous sodium acetate. The neutralized coupling mixture was allowed to stand in an ice bath for one hour, with occasional stirring, and then was diluted with 250 parts of cold water, with good stirring. The dye compound which precipitated was recovered by filtration, washed with water until neutral and air dried. It has the formula:

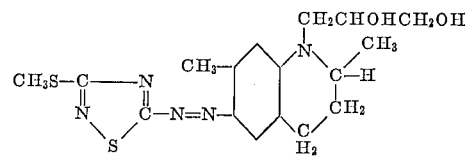

The dye obtained weighed 1.50 grams (76.4%). It dyed cellulose acetate fabric red-violet shades having excellent fastness to light, linear aromatic polyester fabric red-violet shades having good fastness to light, and acrylonitrile polymer fabric and nylon fabric violet shades having good light fastness.

EXAMPLE 11

A solution of 1.08 grams of N-β-hydroxethyl-2,7-dimethylbenzomorpholine in 12.5 ml. of a 6:1 propionic-acetic acid mixture was coupled according to the procedure of Example 10(B) with 12.5 ml. of a 5-amino-3-methylthio-1,2,4-thiadiazole diazonium solution prepared as in Example 10(A). The dye obtained weighed 1.4 grams and dyed cellulose acetate, linear aromatic polyester, acrylic, modacrylic, and nylon fabrics red-violet to violet. Light fastness was excellent on all these fabrics.

EXAMPLE 12

5 ml. (.002 mole) of the diazonium solution prepared as in Example 10(A) were coupled with 0.43 gram (0.002 mole) of N-β-cyanoethyl-2,7-dimethyltetrahydroquinoline in accordance with the procedure of Example 10(B). There was obtained 0.52 gram (70%) of dye which colored cellulose acetate, linear aromatic polyester, modacrylic and nylon fabrics red-violet shades having good fastness to light.

EXAMPLE 13

5 ml. of the diazonium solution prepared as in Example 10(A) were coupled with 0.38 gram (0.002 mole) of N-β-hydroxyethyl-7-methyltetrahydroquinoline in accordance with the procedure of Example 10(B) to give 0.54 gram (77.5%) of product. The dye compound obtained colored cellulose acetate, linear aromatic polyester, modacrylic and nylon fabrics red-violet shades.

EXAMPLE 14

1.79 grams (0.01 mole) of 5-amino-3-methylsulfonyl-1,2,4-thiadiazole were diazotized in accordance with the general procedure described in Example 10(A) using the molar proportions of reactants indicated in Example 10(A). 25 ml. of diazonium solution were obtained.

5 ml. of the diazonium solution thus obtained were coupled with 0.47 gram (0.002 mole) of N-(2,3-dihydroxypropyl)-2,7-dimethyltetrahydroquinoline. Coupling and recovery of the azo dye compound formed were carried out in accordance with the general procedure described in Example 10(B). The yield of dye was 0.49 gram (58%). It dyed cellulose acetate, linear aromatic polyester, modacrylic and nylon fabrics violet to blue-violet shades having excellent fastness to light.

EXAMPLE 15

0.41 gram (0.002 mole) of N-β-hydroxyethyl-2,7-dimethylbenzomorpholine was coupled with 5 ml. of a 5-amino-3-methylsulfonyl-1,2,4-thiadiazole diazonium solution prepared as in Example 14. Coupling and recovery of the azo dye compound formed were carried out in accordance with the general procedure described in Example 10(B). The yield of dye was 0.57 gram (72%). It dyed cellulose acetate, linear aromatic polyester and nylon fabrics violet to blue-violet shades having good fastness to light. The dyeings obtained on modacrylic fabric had good to excellent fastness to light.

EXAMPLE 16

3.22 grams (0.02 mole) of 5-amino-3-ethylthio-1,2,4-thiadiazole were diazotized in accordance with the procedure described in Example 10(A) to obtain 50 ml. of clear diazonium solution.

5 ml. of the diazonium solution obtained as just described were coupled with 0.42 gram (0.002 mole) of N-β-difluoroethyl-2-methyltetrahydroquinoline. Coupling and recovery of the azo dye compound formed were carried out in accordance with the general procedure described in Example 10(B). The dye compound obtained yielded violet-red shades on cellulose acetate and linear aromatic polyester fabrics. The fastness to light of the dyed cellulose acetate fabrics was good.

EXAMPLE 17

5 ml. of the diazonium solution prepared in Example 16 were coupled with 0.002 gram mole of N-β-hydroxyethyl-2,5-dimethylbenzomorpholine. Coupling and recovery of the azo compound formed were carried out in accordance with the procedure described in Example 10(B). The azo compound obtained had good affinity for linear aromatic polyester, modacrylic, nylon and cellulose acetate fabrics and yielded reddish-violet dyeings on these materials having good fastness to light.

EXAMPLE 18

5 ml. of the diazonium solution prepared in Example 16 were coupled with 0.002 gram mole of N-β-hydroxypropyl-2,5-dimethylbenzomorpholine. Coupling and recovery of the azo compound formed were carried out in accordance with the procedure described in Example 10(B). The azo compound obtained had good affinity for linear aromatic polyester, modacrylic, nylon and cellulose acetate fabrics and yielded reddish-violet dyeings on these materials having good fastness to light.

EXAMPLE 19

0.002 gram mole of 5-amino-3-ethylsulfonyl-1,2,4-thiadiazole was diazotized in accordance with the general procedure described in Example 10(A) and the diazonium compound obtained was coupled with 0.002 gram mole of N-4-methoxybutyl-tetrahydroquinoline. Coupling and recovery of the azo dye compound formed were carried out in accordance with the general procedure described in Example 10(B). The dye compound thus obtained colored cellulose acetate and linear aromatic polyester fabrics violet shades.

EXAMPLE 20

0.002 gram mole of 5-amino-3-ethylsulfonyl-1,2,4-thiadiazole was diazotized in accordance with the general procedure described in Example 10(A) and the diazonium compound obtained was coupled with 0.40 gram (0.002 mole) of N-β-cyanoethyl-7-methyltetrahydroquinoline. Coupling and recovery of the azo dye compound formed were carried out in accordance with the general procedure described in Example 10(B). The dye compound thus obtained dyed cellulose acetate, modacrylic, nylon and linear aromatic polyester fabrics violet shades having good fastness to light.

EXAMPLE 21

0.5 gram of the dye prepared in Example 13 by coupling diazotized 5-amino-3-methylthio-1,2,4-thiadiazole with N-β-hydroxyethyl-7-methyltetrahydroquinoline was dissolved in 20 ml. of acetic acid and heated on a steam bath with 1.0 gram of acetic anhydride for 1 hour. Upon drowning in water, the acetylated dye (in which the β-hydroxyethyl group is converted to a β-acetoxyethyl group) was obtained which gave the same red-violet shades on the various fabrics but which had somewhat better wash, sublimation and light fastness properties than did the corresponding unacetylated dye of Example 13.

EXAMPLE 22

0.5 gram of the azo compound prepared in Example 17 was heated in 20 ml. of dry benzene solution with 1.0 gram of phenylisothiocyanate for 1 hour on a steam bath. The resulting azo dye compound containing a phenylisocarbamoyloxyethyl group attached to the nitrogen atom of the benzomorpholine coupler colored cellulose acetate, linear aromatic polyester, modacrylic and nylon fabrics reddish-violet to violet shades. The dye compound obtained has the formula:

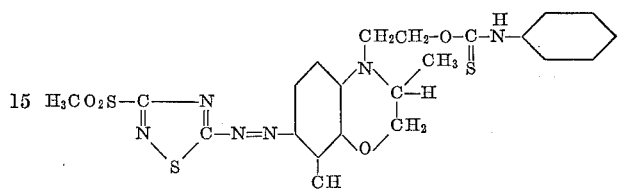

EXAMPLE 23

0.5 gram of the azo compound prepared in Example 13 was heated in 20 ml. of dry benzene with 1.0 gram of phenylisothiocyanate for 1 hour on a steam bath. The resulting azo dye compound containing a phenylthiocarbamoyloxyethyl group

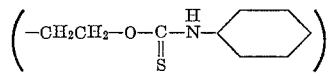

attached to the nitrogen atom of the tetrahydroquinoline component colored cellulose acetate, linear aromatic polyester, modacrylic and nylon fabrics violet shades.

EXAMPLE 24

3.5 grams (0.02 mole) of 5-amino-3-n-propylthio-1,2,4-thiadiazole were diazotized in accordance with the procedure described in Example 10(A) to obtain 50 ml. of a clear diazonium solution. 12.5 ml. of this diazonium solution were coupled with 1.17 grams (0.005 mole) of N-β-acetoxyethyl-7-methyltetrahydroquinoline. Coupling and recovery of the azo compound formed were carried out in accordance with the general procedure described in Example 10(B). 1.36 grams of a dye which dyed linear aromatic polyester, cellulose acetate, nylon and modacrylic fabrics reddish-violet shades having good fastness properties were obtained.

EXAMPLE 25

3.78 grams of 5-amino-3-tert-butylsulfonyl-1,2,4-thiadiazole were diazotized in accordance with the procedure described in Example 10(A) to obtain 50 ml. of a clear diazonium solution. 12.5 ml. of this diazonium solution were coupled with 1.55 grams (0.005 mole) of N-phenylcarbamoyloxyethyl-2,7-dimethylbenzomorpholine. Coupling and recovery of the azo compound formed were carried out in accordance with the general procedure described in Example 10(B). The azo dye compound obtained colored cellulose acetate, linear aromatic polyester, nylon and modacrylic fabrics violet to blue-violet shades which had excellent fastness to light.

EXAMPLES 26–35

Similarly, in the same manner as in Examples 24 and 25,

(26) 5-amino-3-isopropylthio-1,2,4-thiadiazole,
(27) 5-amino-3-isopropylsulfonyl-1,2,4-thiadiazole,
(28) 5-amino-3-sec.-butylthio-1,2,4-thiadiazole,
(29) 5-amino-3-sec.-butylsulfonyl-1,2,4-thiadiazole,
(30) 5-amino-3-isobutylthio-1,2,4-thiadiazole,
(31) 5-amino-3-isobutylsulfonyl-1,2,4-thiadiazole,
(32) 5-amino-3-tert.-butylthio-1,2,4-thiadiazole,
(33) 5-amino-3-n-propylsulfonyl-1,2,4-thiadiazole,
(34) 5-amino-3-n-butylthio-1,2,4-thiadiazole, and
(35) 5-amino-3-n-butylsulfonyl-1,2,4-thiadiazole respectively, were diazotized in accordance with the procedure described in Example 10(A). The resulting diazonium solutions obtained were coupled with the correspondingly numbered coupling components set forth hereinafter.

(26) N-2,3-dihydroxypropyl-2,7-dimethyltetrahydroquinoline,
(27) N-2,3-dihydroxypropyl-2,7-dimethylbenzomorpholine,
(28) N-2-cyanoethyl-2,7-dimethyltetrahydroquinoline,
(29) N-2-hydroxyethyl-7-methyltetrahydroquinoline,
(30) N-2,2-difluoroethyl-2-methyltetrahydroquinoline,
(31) N-2-hydroxypropyl-2,5-dimethylbenzomorpholine,
(32) N-2-acetoxyethyl-7-methyltetrahydroquinoline,
(33) N-4-methoxybutyltetrahydroquinoline,
(34) N-phenylcarbamoyloxyethyl-2,7-dimethylbenzomorpholine, and
(35) N-phenylthiocarbamoyloxyethyl-2,5-dimethylbenzomorpholine.

Coupling and recovery of the monoazo compounds formed were carried out in accordance with the general procedure described in Example 10(B). All of the resulting monoazo dye compounds dyed cellulose acetate, acrylic, linear aromatic polyester and nylon textile fabrics red-violet to blue-violet shades having good fastness to light.

Following the procedures described in Examples 1 to 25, inclusive, the monoazo dye compounds indicated hereinafter were prepared. The color stated is that which the dye gives on linear aromatic polyester textile materials. Nylon, cellulose alkyl carboxylic acid ester, having 2 to 4 carbon atoms in the acid groups thereof, and acrylonitrile polymer textile materials are dyed shades that are shifted somewhat more toward blue.

| Diazonium Compound | Coupling Component | Color |
|---|---|---|
| 5-amino-3-methylthio-1,2,4-thiadiazole. | N-β,γ-dihydroxypropyl-2,4,7-trimethyltetrahydroquinoline. | Red-violet. |
| Do | N-β-hydroxyethyl-7-chlorotetrahydroquinoline. | Red. |
| Do | N-γ-hydroxypropyl-7-trifluoromethyltetrahydroquinoline. | Red. |
| Do | N-β,γ-dihydroxypropyl-7-acetylaminotetrahydroquinoline. | Violet. |
| Do | N-β,γ-dihydroxypropyl-tetrahydroquinoline. | Red. |
| Do | N-γ-cyanopropyl-2-methyl-tetrahydroquinoline. | Red. |
| Do | N-(β-methyl-β,γ-dihydroxypropyl)-2-methyltetrahydroquinoline. | Red-violet. |
| Do | 7-methyltetrahydroquinoline. | Orange-red. |
| Do | N-allyl-5-methyltetrahydroquinoline. | Red-violet. |
| Do | N-β-acetoxyethyl-2,7-dimethyltetrahydroquinoline. | Do. |
| Do | N-β,γ-dihydroxypropyl-benzomorpholine. | Red. |
| Do | N-β-hydroxypropyl-2-methylbenzomorpholine. | Red-violet. |
| Do | N-4-hydroxybutylbenzomorpholine. | Violet-red. |
| Do | N-β-cyanoethyl-5-methyl-benzomorpholine. | Do. |
| Do | 2,7-dimethylbenzomorpholine. | Orange-red. |
| 5-amino-3-n-propylthio-1,2,4-thiadiazole. | N,β,γ-dihydroxypropyl-tetrahydroquinoline. | Red. |
| 5-amino-3-tert.-butylsulfonyl-1,2,4-thiadiazole. | N-β,γ-dihydroxypropyl-2-methylbenzomorpholine. | Red-violet. |
| 5-amino-3-methylthio-1,2,4-thiadiazole. | N-β-methylthioethyl-2,5-dimethylbenzomorpholine. | Do. |
| Do | N-β,γ-dihydroxypropyl-2,7-dimethylbenzomorpholine. | Violet-red. |

| Diazonium Compound | Coupling Component | Color |
|---|---|---|
| 5-amino-3-methylsulfonyl-1,2,4-thiadiazole. | N-β-cyanoethyl-2,7-dimethyltetrahydroquinoline. | Violet. |
| Do | N-β-methoxyethyl-2-methyltetrahydroquinoline. | Do. |
| Do | N-β-carbomethoxyethyl-7-methoxytetrahydroquinoline. | Blue-violet. |
| Do | N-β-hydroxyethyl-2,2,4,7-tetramethyltetrehydroquinoline. | Violet. |
| Do | N-β-hydroxyethyl-2-methylbenzomorpholine. | Do. |
| Do | N-β-cyanoethyl-7-methyl-benzomorpholine. | Do. |
| Do | N-β-methyl-β,γ-dihydroxypropyl-2,7-dimethylbenzomorpholine. | Blue-violet. |
| Do | N-γ-hydroxypropyl-2,5-dimethylbenzomorpholine. | Do. |
| 5-amino-3-ethylthio-1,2,4-thiadiazole. | N-β-cyanoethyl-2,7-dimethyltetrahydroquinoline. | Red. |
| Do | N-β-methoxyethyl-2-methyltetrahydroquinoline. | Red-violet. |
| Do | N-β-carbomethoxyethyl-7-methoxytetrahydroquinoline. | Violet. |
| Do | N-β-hydroxyethyl-2,2,4,7-tetramethyltetrahydroquinoline. | Red-violet. |
| Do | N-β-hydroxyethyl-2-methylbenzomorpholine. | Do. |
| Do | N-β-cyanoethyl-7-methyl-benzomorpholine. | Red. |
| Do | N-β-methyl-β,γ-dihydroxypropyl-2,7-dimethylbenzomorpholine. | Red-violet. |
| Do | N-γ-hydroxypropyl-2,5-dimethylbenzomorpholine. | Do. |
| 5-amino-3-ethylsulfonyl-1,2,4-thiadiazole. | N-β-cyanoethyl-2,7-dimethyltetrahydroquinoline. | Violet. |
| Do | N-β-methoxyethyl-2-methyltetrahydroquinoline. | Do. |
| Do | N-β-carbomethoxyethyl-7-methoxytetrahydroquinoline. | Blue-violet. |
| Do | N-β-hydroxyethyl-2,2,4,7-tetramethyltetrahydroquinoline. | Do. |
| Do | N-β-hydroxyethyl-2-methylbenzomorpholine. | Violet. |
| Do | N-γ-cyanopropyl-7-methyl-benzomorpholine. | Do. |
| Do | N-β-methyl-β,γ-dihydroxypropyl-2,7-dimethylbenzomorpholine. | Blue-violet. |
| Do | N-γ-hydroxypropyl-2,5-dimethylbenzomorpholine. | Do. |

The following table illustrates the colors imparted by 3 - ethylsulfonyl - 1,2,4 - thiadiazolyl - 5 - azo - 6' - (N-β,γ-dihydroxypropyl)-2,7-dimethyltetrahydroquinoline, a representative dye of our invention on four different types of textile materials. This dye has the formula:

$$C_2H_5SO_2-C\underset{N}{\overset{N}{\underset{\|}{-}}}\underset{S}{\overset{}{C}}-N=N-\underset{H_2}{\overset{CH_2}{\bigcirc}}\underset{CH_2}{\overset{CH_3}{\underset{C-H}{N}\underset{CH_3}{\overset{CH_2CHOHCH_2OH}{}}}}$$

| Fabric | Color | Affinity | Light |
|---|---|---|---|
| Cellulose acetate | Violet | Excellent | Good. |
| Linear aromatic polyester | do | Good | Fair. |
| Modacrylic | Blue-violet | do | Do. |
| Nylon | do | do | Good. |

In the preceding table, the column headed "Light" refers to the light fastness of the dyeing.

A somewhat redder dye which exhibited equally good affinity and light fastness was made by coupling 5-amino-3-methylthio-1,2,4-thiadiazole with N-β-hydroxyethyl-2,7-dimethylbenzomorpholine.

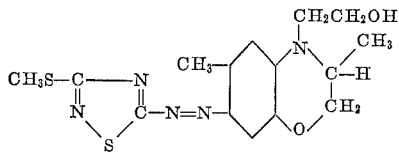

While numerous examples of the monoazo compounds of our invention are dyes for cellulose alkyl carboxylic trative and not limitative. Any of the 5-amino-1,2,4-thiadiazole compounds can be diazotized and coupled with a benzomorpholine or tetrahydroquinoline coupling component free of a water-solubilizing group to obtain compounds of our invention.

As previously indicated, the new monoazo compounds of our invention are days for cellulose alkyl carboxylic acid ester, having 2 to 4 carbon atoms in the acid groups thereof, nylon, polyester and acrylonitrile polymer textile materials. In addition to these textile materials graft polymers such as those described in U.S. Patents 2,620,324, 2,649,434, 2,657,191 and 2,827,450 can be dyed with our new monoazo dye compounds. The textile materials referred to herein can be dyed using known dyeing methods and can be in any desired form such as fiber, filament, yarn or cloth form, for example. One or more than one of our monoazo dye compounds can be employed in the coloring operation. Our new monoazo dyestuffs can be directly applied to said textile materials in the form of an aqueous suspension which can be prepared by finely grinding them to a paste in the presence of a sulfonated oil, sodium lignin sulfonate, or other suitable dispersing agent and dispersing the resulting paste in water.

The following example illustrates one satisfactory way in which our new monoazo dye compounds can be used to dye graft polymer and acrylonitrile polymer textile materials. .1 gram of dye is dissolved by warming in 5 ml. of ethylene glycol monomethyl ether. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 ml. with warm water. 5 ml. of a 5% aqueous solution of formic acid or acetic acid are added and then 10 grams of fabric made from an acrylic fiber are entered. In the case of fabrics made of Orlon 42 fiber the dyeing is carried out at the boil for one hour. In the case of fabrics made of Verel acrylic fiber the dyebath temperature should not exceed 90° C. in order to avoid damage to the fiber. The dyed material is then washed well with hot water and dried.

The foregoing dyeing example is merely illustrative of the manner in which the new monoazo dye compounds of our invention can be applied to graft polymer and acrylonitrile polymer textile materials. Larger or smaller amounts of dye can be employed, for example. Similarly, dyeing assistants other than Igepal CA can be employed.

The same procedure can be used in the case of linear aromatic polyester textile materials with the exception that a dyeing assistant ordinarily referred to as a "carrier" is used in the dyeing operation and the dyeing is carried out at the boil. Butyl benzoate, o-phenylphenol, p-phenylphenol, salicyclic acid, methyl salicylate and benzoic acid are illustrative of the carriers that can be employed. Polyester textile materials can also be dyed by the methods described in U.S. Patents 2,757,064 and 2,880,050, for example.

Nylon and said cellulose alkyl carboxylic acid ester. textile materials can be dyed, for example, by the procedure described in U.S. Patent 2,785,157. Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C.–55° C., for example, can be used, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, 1/3% to 3% (by weight) of that of the textile material, although lesser or greater amounts of dye can be used.

Illustrative of such dyeing operations for cellulose ester and nylon textile materials with reference to the dyeing of cloth is the following procedure:

16 milligrams of dye are ground with an aqueous solution of sodium lignin sulfonate until well dispersed or alternately the dye can be dissolved in 5 cc. of hot ethylene glycol monoethyl ether. The dispersion or solution, as the case may be, is then poured into 150 cc. of water to which a small amount of a surface-active agent such as Igepon T ($C_{17}H_{33} \cdot CO \cdot N(CH_3) \cdot C_2H_4SO_3Na$) Nekal BX (sodium alkylnaphthalenesulfonate) or Orvus (sodium lauryl sulfate-type) has been added. The dye bath is then brought to the desired temperature and 5 grams of well wet-out cloth are added thereto. Dyeing is continued until the proper shade is reached. From time to time throughout the dyeing operation, the cloth is worked to promote even dyeing.

Although the invention has been described in considerable detail with reference to certain preferred embodiments thereof, it will be understood that variations and modifications can be effected without departing from the spirit and scope of the invention as described hereinbefore and as defined in the appended claims.

We claim:
1. The azo compounds having the formula:

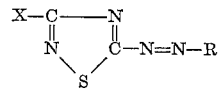

wherein X represents a member selected from the group consisting of a low carbon alkylthio radical and a low carbon alkyl sulfonyl radical and R represents a member selected from the group consisting of the radical of a tetrahydroquinoline coupling compound free of a water-solubilizing group and the radical of a benzomorpholine coupling compound free of a water-solubilizing group, and wherein said tetrahydroquinoline and benzomorpholine radicals are joined through the carbon atom in their 6-positions to the azo linkage.

2. The azo compounds according to claim 1 wherein X is a methylthio radical.

3. The azo compounds according to claim 1 wherein X is an ethylthio radical.

4. The azo compounds according to claim 1 wherein X is a methylsulfonyl radical.

5. The azo compounds according to claim 1 wherein X is a ethylsulfonyl radical.

6. The azo compounds according to claim 1 wherein X is an n-propylthio radical.

7. The azo compound having the formula:

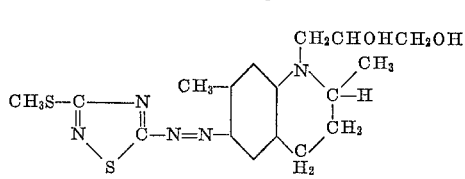

8. The azo compound having the formula:

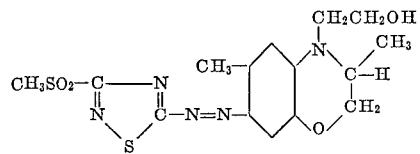

9. The azo compound having the formula:

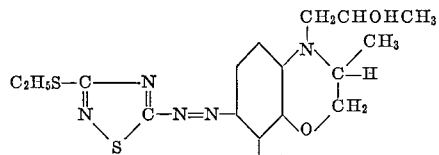

10. The azo compound having the formula:

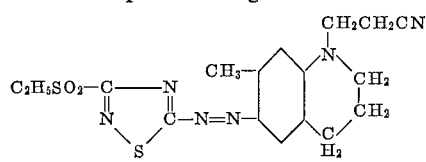

11. The azo compound having the formula:

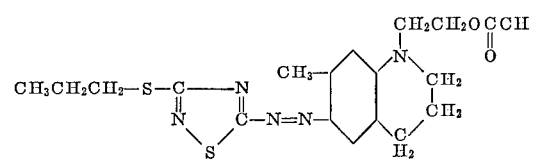

References Cited by the Examiner
UNITED STATES PATENTS

| | | | |
|---|---|---|---|
| 2,283,211 | 5/42 | Jones et al. | 260—155 |
| 2,773,054 | 12/56 | Straley et al. | 260—155 |
| 2,839,523 | 6/58 | Towne et al. | 260—155 |
| 2,955,901 | 10/60 | Kruckenberg | 8—41 |
| 2,972,508 | 2/62 | Kruckenberg et al. | 8—41 |

CHARLES B. PARKER, *Primary Examiner.*

REYNOLD J. FINNEGAN, DONALD M. PAPUGA,
*Assistant Examiners.*